(12) United States Patent
Eramaa et al.

(10) Patent No.: US 12,241,407 B2
(45) Date of Patent: Mar. 4, 2025

(54) METHOD OF CONTROLLING DEFLAGRATION COMBUSTION PROCESS IN PISTONLESS COMBUSTOR

(71) Applicant: Finno Energy Oy, Vantaa (FI)

(72) Inventors: Timo Eramaa, Vantaa (FI); Heikki Salminen, Vantaa (FI)

(73) Assignee: Finno Exergy Oy, Vantaa (FI)

( * ) Notice: Subject to any disclaimer, the term of this patent is extended or adjusted under 35 U.S.C. 154(b) by 0 days.

(21) Appl. No.: 17/617,373

(22) PCT Filed: Jun. 8, 2020

(86) PCT No.: PCT/FI2020/050398
§ 371 (c)(1),
(2) Date: Dec. 8, 2021

(87) PCT Pub. No.: WO2020/249862
PCT Pub. Date: Dec. 17, 2020

(65) Prior Publication Data
US 2022/0252005 A1 Aug. 11, 2022

(30) Foreign Application Priority Data

Jun. 9, 2019 (FI) ..................................... 20195487
Jun. 9, 2019 (FI) ..................................... 20195488

(51) Int. Cl.
*F23R 7/00* (2006.01)
*F02C 5/12* (2006.01)
*F23R 3/58* (2006.01)

(52) U.S. Cl.
CPC .................. *F02C 5/12* (2013.01); *F23R 3/58* (2013.01); *F23R 7/00* (2013.01); *F05D 2240/35* (2013.01)

(58) Field of Classification Search
CPC ...... F02C 5/12; F02C 5/10; F23R 3/58; F23R 7/00
See application file for complete search history.

(56) References Cited

U.S. PATENT DOCUMENTS 2,004,945 A * 6/1935 Holzwarth ................ F02C 5/12
60/776
2,049,446 A * 8/1936 Holzwarth ................ F02C 5/12
415/159

(Continued)

FOREIGN PATENT DOCUMENTS

GB 1274728 A * 5/1972

*Primary Examiner* — Ted Kim
(74) *Attorney, Agent, or Firm* — Renner, Kenner, Greive, Bobak, Taylor & Weber

(57) ABSTRACT

The method is for controlling a deflagration combustion process in a pistonless combustor. The method includes scavenging combustion products of the previous cycle, introducing air into the combustor thereby initiating a flow pattern having a first flow component within the combustor. Air is introduced into the pistonless combustor in a nonparallel angle in relation to the previous air input and thereby creating a second flow component to the flow pattern for increasing speed of combustion propagation. Fuel mixed into the air is introduced for creating a fuel-air mixture flowing within the flow pattern, and igniting the fuelair mixture within the pistonless combustor thereby increasing pressure within the pistonless combustor.

10 Claims, 6 Drawing Sheets

(56) References Cited

U.S. PATENT DOCUMENTS

| | | | | | |
|---|---|---|---|---|---|
| 2,054,081 | A | * | 9/1936 | Holzwarth | F02C 5/12 |
| | | | | | 60/39.79 |
| 2,480,626 | A | * | 8/1949 | Bodine, Jr. | F02K 7/06 |
| | | | | | 60/39.77 |
| 4,218,426 | A | * | 8/1980 | Dahmen | F23C 3/006 |
| | | | | | 422/182 |
| 4,642,046 | A | * | 2/1987 | Saito | F23R 7/00 |
| | | | | | 431/1 |
| 4,651,712 | A | * | 3/1987 | Davis | F23C 15/00 |
| | | | | | 431/1 |
| 5,603,299 | A | * | 2/1997 | Yuzuriha | F02B 31/00 |
| | | | | | 123/308 |
| 2004/0128974 | A1 | * | 7/2004 | Laper | F23R 7/00 |
| | | | | | 60/39.6 |
| 2005/0081822 | A1 | * | 4/2005 | Yageta | F02B 31/08 |
| | | | | | 123/188.14 |
| 2005/0106517 | A1 | * | 5/2005 | Okada | F23C 3/002 |
| | | | | | 431/185 |
| 2020/0392911 | A1 | * | 12/2020 | Eramaa | F02C 6/12 |

* cited by examiner

METHOD OF CONTROLLING DEFLAGRATION COMBUSTION PROCESS IN PISTONLESS COMBUSTOR

This is a US national phase patent application that claims priority from PCT/FI2020/050398 filed 8 Jun. 2020, that claims priority from Finnish Patent Application No. 20195488, filed 9 Jun. 2019 and Finnish Patent Application No. 20195487, filed 9 Jun. 2019.

FIELD OF THE INVENTION

The present invention relates to controlling of a deflagration combustion process in a pistonless combustor.

BACKGROUND OF THE INVENTION

Gas turbine combustion systems conventionally operate on a steady and continuous manner. Compressor supplies a continuous flow of air to the combustor. Inside combustor, fuel is added to the airflow, and consequently ignited. As the combustion air needs to be driven through the combustor, there is a loss of total pressure of around 3-5% over the combustion chamber. The loss of pressure is shown as diminished pressure at the turbine entry, detracting from the turbine's ability to generate mechanical power, therefore taking away of the total thermal efficiency of the gas turbine.

Gas turbine companies make a lot of effort to improve efficiency, in order to cut fuel consumption and carbon dioxide ($CO_2$) emissions; The main method used to improve gas turbine efficiency is by increasing overall pressure ratio and enabling a higher turbine inlet temperature by targeted cooling, as well as by development of materials with higher resistance to high temperature environment, and furthermore, by optimizing the aerodynamic efficiencies of the compressor and turbine components.

New and ambitious medium to long range goals have been established to meet the demands of mitigating the emissions that indorse climate change. The incremental development of gas turbine efficiency improvement starts showing an asymptotic development of diminishing returns, and possibly indicates that alternative methods of power generation and efficiency improvement need to be sought. To increase the competitiveness of the gas turbines in general, it essential to find a technology that bypasses the design constraints that the conventional gas turbine process is subjected to, and makes it possible to generate a step change in the efficiency.

It is generally recognized that by replacing the conventional gas turbine's combustor with a combustor that is able to increase at the same time temperature and pressure of the working fluid, a step change in the efficiency is possible. This principle is known as constant volume, or pressure gain combustion. Known idealisations of such a process are the Humphrey cycle, as well as the Atkinson cycle. It is a known fact based on rigorous thermodynamic principles, that such a mode of heat introduction is superior to that of the Brayton or Joule type cycle used in the regular gas turbine. If both cycles start heat introduction from the same state, a firm base for efficiency improvement is provided by lessening the irreversible exergy loss indicated by the entropy generation integral by use of the pressure gain combustion system. As a result, more work potential is introduced to the turbine, manifested by the increased overall pressure ratio made available to the turbine.

Because of its well-known thermodynamic advantages, pressure gain combustion has been investigated for decades. Many accomplished companies and research institutions are pushing to find workable solutions. Lately, there have been multiple approaches attempting to harness the potential of pressure gain combustion, most of them trying to exploit detonation, but with no real breakthrough. Usually, the failure is due to insufficient pressure gain, or the machinery not enduring the destructive nature of detonation.

BRIEF DESCRIPTION OF THE INVENTION

An object of the present invention is thus to provide a method which eliminates or alleviates the above disadvantages. The object of the invention is achieved by a method which is characterized by what is stated in the independent claim. The preferred embodiments of the invention are disclosed in the dependent claims.

The invention is based on the idea of timing air and fuel inputs to a combustor to initiate and maintain a flow pattern having two flow components to achieve fast deflagration combustion in a pistonless combustor.

An advantage of the method of the invention is that the flow pattern is maintained within the combustor and pressure can rise even in case of an open output. A significant pressure gain can be achieved with the combustion process by optimising velocity of heat release with the claimed method.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
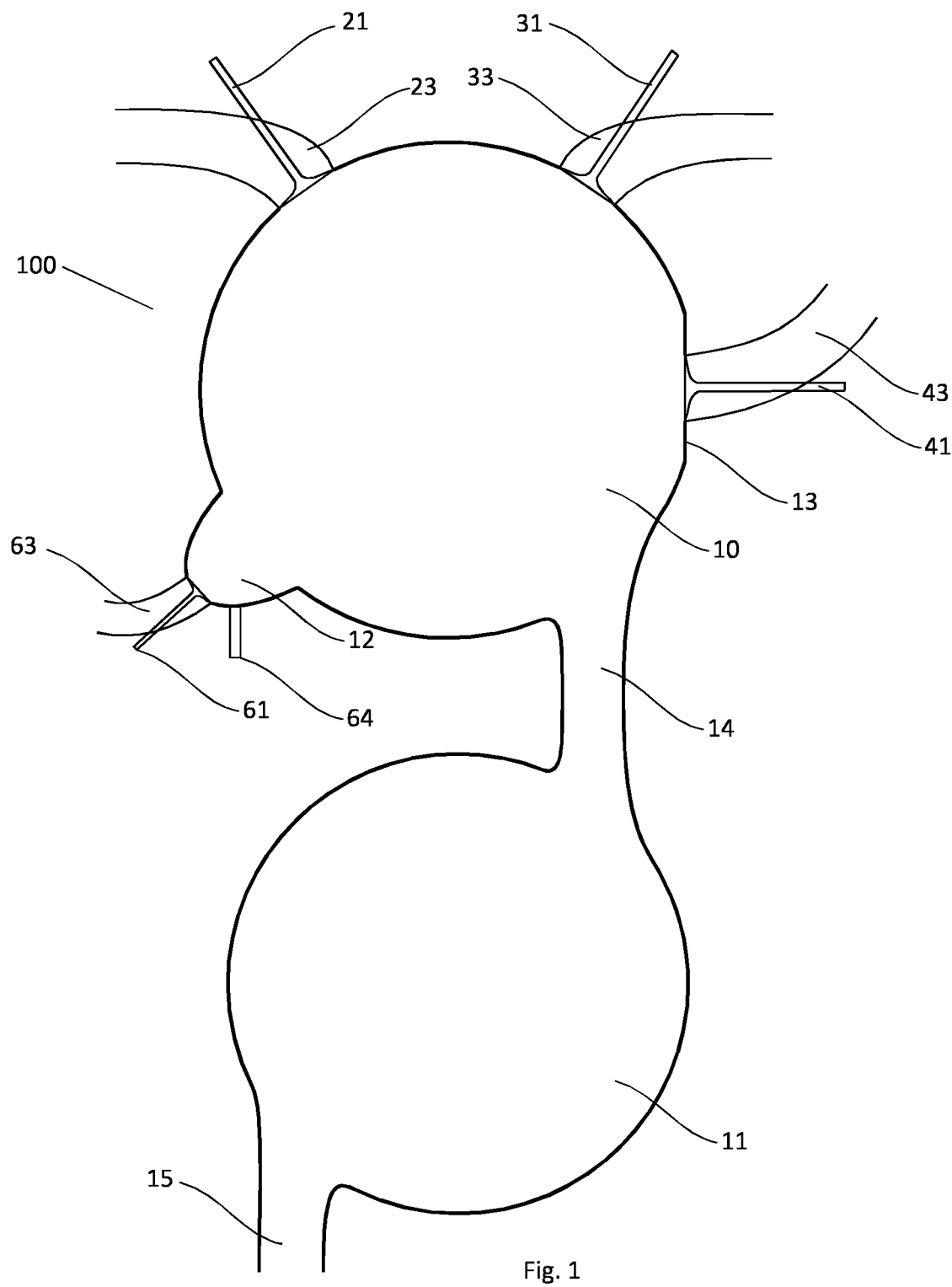
FIG. 1 illustrates an embodiment of a pistonless combustor.

Referring to FIG. 1 and FIGS. 3 to 5, a pistonless combustor 100 comprises a first combustion chamber 10, a second combustion chamber 11 and preferably a pre-combustion chamber 12. Preferably the pre-combustion chamber 12 forms a cavity or a protrusion on the periphery or wall of the first combustion chamber 10. Preferably the volume of the pre-combustion chamber 12 is at most 10% of the volume of the first combustion chamber 10. In an embodiment the pre-combustion chamber has a semi-open configuration in which there is a line of sight to each point in an inner wall of the pre-combustion chamber 12 from an opening connecting the pre-combustion chamber to the first combustion chamber. The pre-combustion chamber preferably comprises an ignition device 64 for igniting a fuel-air mixture within the pre-combustion chamber. The ignition device can be for example a spark plug, or a microwave, plasma or laser ignition system. In an embodiment, the pre-combustion chamber 12 can be a pre-chamber or a torch ignition device known from prior art internal combustion piston engines.

The first combustion chamber can have a shaped wall section 13 for aligning one or more input valves, such as a first input valve 21, a second input valve 31 or a fifth input valve 41. In FIG. 1 the shaped wall section 13 is used for aligning the fifth input valve 41. A passage 14 connects the first combustion chamber 10 to the second combustion chamber. Fluids, such as air, exhaust gas and fuel can flow freely through the passage 14 between the first combustion chamber and the second combustion chamber. The flow of fluids through the passage is preferably not controlled by any valves. The exhaust gas and any other remaining fluids exit the pistonless combustor through output channel 15 which is preferably in connection with the second combustion chamber 11. In an embodiment, the pistonless combustor 100 comprises only one combustion chamber, i.e. the first combustion chamber 10, and the passage 14 is replaced with the output channel 15. Sizing, shaping and positioning of the passage 14 and the output channel 15 are also important means for controlling flows within the pistonless combustor. For example, in the embodiment shown in FIG. 4, the passage 14 is positioned asymmetrically to the inlets and input valves, and the passage has a kidney-shaped cross-section. In general, an asymmetric positioning of the passage 14 compared to the input valves 21, 22, 31, 32, 41, 42 has been found preferable.

In case where the output channel 15 is in connection with the second combustion chamber 11, the output channel 15 is preferably located opposite to the passage 14 such that flow from the passage 14 is directed away from the output channel 15. Such direction of flow hinders the flow from the passage 14 to the output channel 15 thereby creating a third flow component 93 within the second combustion chamber and allows for any remaining fuel to be combusted in the second combustion chamber 11. Aligning the output channel 15 to a direction opposite to the direction of the third flow component 93 further hinders the flow leaving the second combustion chamber 11 through the output channel 11 but at the same time it reduces efficiency of scavenging. Preferably, the second combustion chamber 11 does not have any fuel inputs and the purpose of the second combustion chamber is only to combust any remaining fuel in an air-rich environment. The second combustion chamber enables an increased burn rate, an improved pressure gain capability and it can be used to reduce NOx emissions.

The first combustion chamber 10 preferably has a spherical inner wall having minor deviations such as input valves 21, 31, 41, 61, the pre-combustion chamber 12, the shaped wall section 13 and the passage 14. In an embodiment, the first combustion chamber 10 has a toroidal inner wall having minor deviations such as input valves 21, 31, 41, 61, the pre-combustion chamber 12, the shaped wall section 13 and the passage 14. In an embodiment, the first combustion chamber 10 has a cylindrical inner wall having minor deviations such as input valves 21, 31, 41, 61, the pre-combustion chamber 12, the shaped wall section 13 and the passage 14. The second combustion chamber 11 preferably has a spherical inner wall having minor deviations such as the passage 14 and the output channel 15. In an embodiment, the second combustion chamber 11 has a toroidal inner wall having minor deviations such as the passage 14 and the output channel 15. In an embodiment, the second combustion chamber 11 has a cylindrical inner wall having minor deviations such as the passage 14 and the output channel 15.

A number of inlets 23, 33, 43 lead to the first combustion chamber and the inlets are controlled with valves 21, 31, 43. A first inlet 23 controlled by a first input valve 21 can be used for scavenging the first combustion chamber 10 and the second combustion chamber 11. An input flow of air can be provided through the first inlet 23 which flows through the first combustion chamber and the second combustion chamber thereby scavenging the pistonless combustor 100. The scavenging fills the combustion chambers with air while forcing exhaust gas to output channel 15. Positioning and aligning of the first inlet 23 and the first input valve 21 are designed to facilitate scavenging of the pistonless combustor. The first combustion chamber can comprise also a third inlet 24 controlled by a third input valve 22 for the same function. The positioning and alignment of the third inlet and the third input valve is similar to the first inlet and the first input valve, and in addition they are positioned and aligned symmetrically or asymmetrically compared to each other. Asymmetric positioning and alignment both increase possibilities to adjust the flows within the first combustion chamber.

A second inlet 33 controlled by a second input valve 31 can be used for input of air, fuel or air-fuel mixture to the first combustion chamber 10. The second inlet 33 and the second input valve 31 are positioned and aligned to produce a first flow component 91 into the first combustion chamber 10. Preferably the second inlet 33 and the second input valve 31 are positioned and aligned to produce an eccentric flow, i.e. a flow directed a certain distance off from a center off the first combustion chamber. Preferably the second inlet 33 and the second input valve 31 are also positioned and aligned to produce an eccentric flow a certain distance off from the passage 14, or a certain distance off from the output channel 15 in case of a pistonless combustor having a single combustion chamber. The first combustion chamber can comprise also a fourth inlet 34 controlled by a fourth input valve 32 for the same function. The positioning and alignment of the fourth inlet and the fourth input valve can be similar to the second inlet and the second input valve but the size of the valve is different—or vice versa. This can create a second flow component 92 in the first combustion chamber. Preferably, in addition they are positioned and aligned symmetrically or asymmetrically compared to each other. Asymmetric positioning and alignment both increase possibilities to adjust the flows within the first combustion chamber. In an embodiment where the number of inlets and input valves is minimized, the second inlet and input valves, or both the second and fourth inlets and input valves can also provide the air for scavenging, and in that case the first and third inlets and input valves can be omitted.

A fifth inlet 43 controlled by a fifth input valve 41 can be used for input of air, fuel or air-fuel mixture to the first combustion chamber 10. The input is provided in a form of a high-speed jet. The jet has an initial velocity of at least 0, 1 Mach, preferably at least 0, 2 Mach. The fifth inlet 43 and the fifth input valve 41 are positioned and aligned to either produce or strengthen a second flow component 92 into the first combustion chamber 10, or to increase turbulence in the first combustion chamber. The second flow component is not parallel to the first flow component 91. Preferably the fifth inlet 43 and the fifth input valve 41 are positioned and aligned to produce an eccentric flow, i.e. a flow directed a certain distance off from a center off the first combustion chamber. Preferably the fifth inlet 43 and the fifth input valve 41 are also positioned and aligned to produce an eccentric flow a certain distance off from the passage 14, or a certain distance off from the output channel 15 in case of a pistonless combustor having a single combustion chamber. Preferably, the fifth inlet 43 and the fifth input valve 41 are positioned on the shaped wall section 13 of the first combustion chamber 10. The shaped wall section can be for example a planar wall section or a wall section having a different curvature than the majority of the first combustion chamber. The first combustion chamber can comprise also a sixth inlet 44 controlled by a sixth input valve 42 for the same function. The positioning and alignment of the sixth inlet and the sixth input valve is similar to the fifth inlet and the fifth input valve, and in addition they are positioned and aligned symmetrically or asymmetrically compared to each other. Asymmetric positioning and alignment both increase possibilities to adjust the flows within the first combustion chamber. Preferably both the fifth input valve 41 and the sixth input valve 43 are positioned on the shaped wall section 13 and a distance 51 of the fifth inlet 42 from a center line 50 of the first combustion chamber is different than a distance 52 of the sixth inlet 44 from the center line 50 of the first combustion chamber. The fifth and sixth inlet channel can be air channels and the fifth and sixth input valves can be air valves.

In general, alignment, positioning, sizing and shaping of the inlet channels and input valves, as well as other openings and channels, offer a wide set of parameters to control flows inside the pistonless combustor. For example, using a set of two different-sized valves instead of a single valve for the same input gives the freedom to adjust flow rate between the two valves and that functionality can be used for creating a desired flow pattern inside the pistonless combustor. Specific details vary depending on the size, shape and desired output of the combustor and also depending on the fuel used and desired operating frequency of the combustor. A person skilled in the art, provided with these design options and pursued objectives, is able to design a pistonless combustor according to the claims of the present disclosure.

FIGS. 2A to 2D disclose four different examples of systems where the pistonless combustor 100 is used to generate electric energy.

Figure 2A:
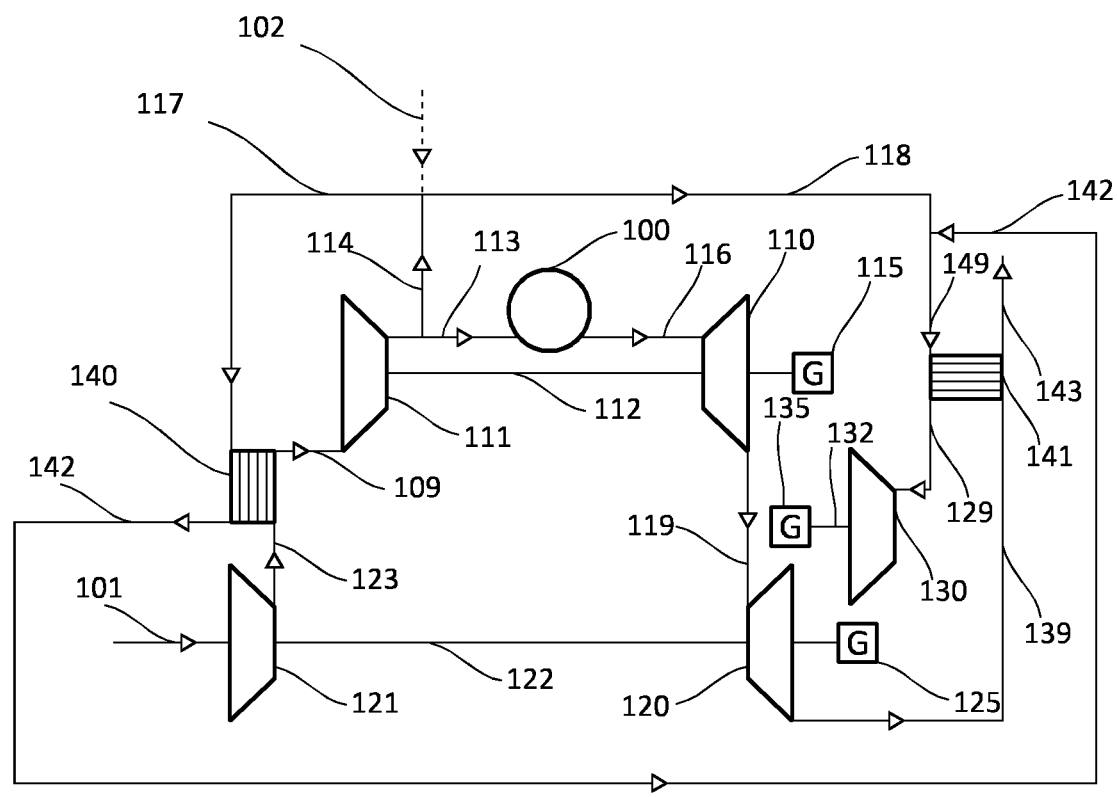
FIGS. 2A to 2D illustrate examples of combustion systems.

Referring to FIG. 2A, an air input 101 is provided for a low-pressure compressor 121. The low-pressure compressor has a common shaft 122 with a low-pressure turbine 120 and a low-pressure generator 125. The output 123 from the low-pressure compressor flows to a first heat exchanger 140 which cools the compressed air. The cooled compressed air is an input 109 for a high-pressure compressor 111. The high-pressure compressor has a common shaft 112 with a high-pressure turbine 110 and a high-pressure generator 115. An output from the high-pressure compressor 111 is divided into an input 113 to the pistonless combustor 100 and into a high-pressure bypass flow 114. Any embodiment of the pistonless combustor 100 presented in the present disclosure can be used. The pistonless combustor uses the high-pressure air input and fuel input to produce an output 116 which is directed to the high-pressure turbine 110 which rotates the shaft 112 which in turn rotates the high-pressure generator 115 to generate electric energy.

The output 119 from the high-pressure turbine is directed to the low-pressure turbine 120 which rotates the shaft 122 which in turn rotates the low-pressure generator 125 to generate electric energy. An output 139 from the low-pressure generator is directed to a second heat exchanger 141 which removes heat from the output flow 139 and the cooled output flow 143 is released from the system through exhaust. In an embodiment a flow from an external heat source can be arranged to the second heat exchanger, the first heat exchanger or both of them either in parallel or in series.

The high-pressure bypass flow 114 from the high-pressure compressor 111 is divided into an input 117 to the first heat exchanger 140 and a flow 118 to the second heat exchanger 141. The division can either be controlled, e.g. with one or more valves, or uncontrolled, i.e. based on pressure differences. The input 117 to the first heat exchanger is heated in the first heat exchanger 140 using the heat extracted from the output 123 from the low-pressure compressor 121. The heated output 142 from the first heat exchanger 140 is combined to the flow 118 to the second heat exchanger 141, thereby creating an input 149 to the second heat exchanger 141. The second heat exchanger heats the input 149 using the heat extracted from the output 139 of the low-pressure turbine 120. The heated output 129 of the second heat exchanger 141 is directed to an auxiliary turbine 130 rotating an auxiliary generator 135 with a shaft 132.

Optionally, an input 102 from an external source can be combined to the high-pressure bypass flow 114. The input 102 can be direct to the first heat exchanger, the second heat exchanger, or both together with the high-pressure bypass flow 114. The external source is preferably an output of a wastegate of a turbocharger of an external combustion engine, but also other high temperature, high pressure sources can be utilized.

Figure 2B:
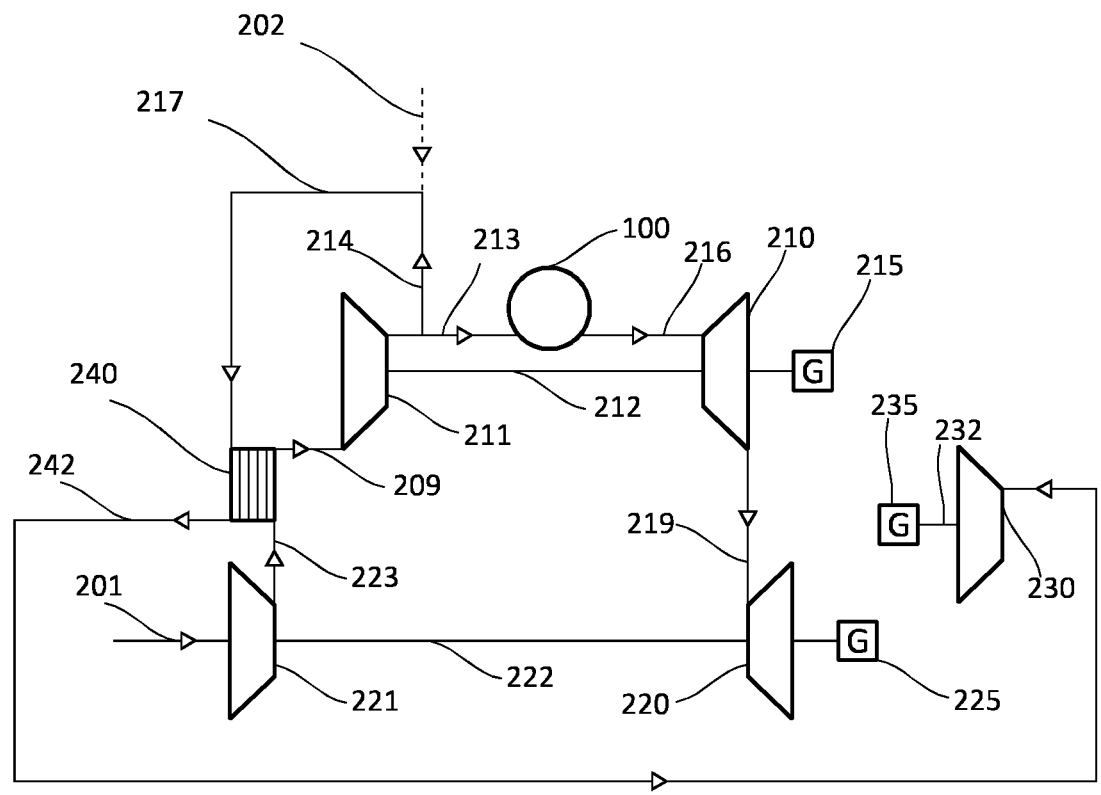

Referring to FIG. 2B, an air input 201 is provided for a low-pressure compressor 221. The low-pressure compressor has a common shaft 222 with a low-pressure turbine 220 and a low-pressure generator 225. The output 223 from the low-pressure compressor flows to a first heat exchanger 240 which cools the compressed air. The cooled compressed air is an input 209 for a high-pressure compressor 211. The high-pressure compressor has a common shaft 212 with a high-pressure turbine 210 and a high-pressure generator 215. An output from the high-pressure compressor 211 is divided into an input 213 to the pistonless combustor 100 and into a high-pressure bypass flow 214. Any embodiment of the pistonless combustor 100 presented in the present disclosure can be used. The pistonless combustor uses the high-pressure air input and fuel input to produce an output 216 which is directed to the high-pressure turbine 210 which rotates the shaft 212 which in turn rotates the high-pressure generator 215 to generate electric energy.

The output 219 from the high-pressure turbine is directed to the low-pressure turbine 220 which rotates the shaft 222 which in turn rotates the low-pressure generator 225 to generate electric energy. An output from the low-pressure generator is released from the system through exhaust.

The high-pressure bypass flow 214 from the high-pressure compressor 211 is directed into an input 217 to the first heat exchanger 240. Optionally, an input 202 from an external source can be combined to the high-pressure bypass flow 214. The external source is preferably an output of a wastegate of a turbocharger of an external combustion engine, but also other high temperature, high pressure sources can be utilized. The high-pressure bypass flow 214 optionally combined with the input 202 is the input 217 to the first heat exchanger which is heated in the first heat exchanger 240 using the heat extracted from the output 223 from the low-pressure compressor 221. The heated output 242 from the first heat exchanger 240 is directed to an auxiliary turbine 230 rotating an auxiliary generator 235 with a shaft 232.

Figure 2C:
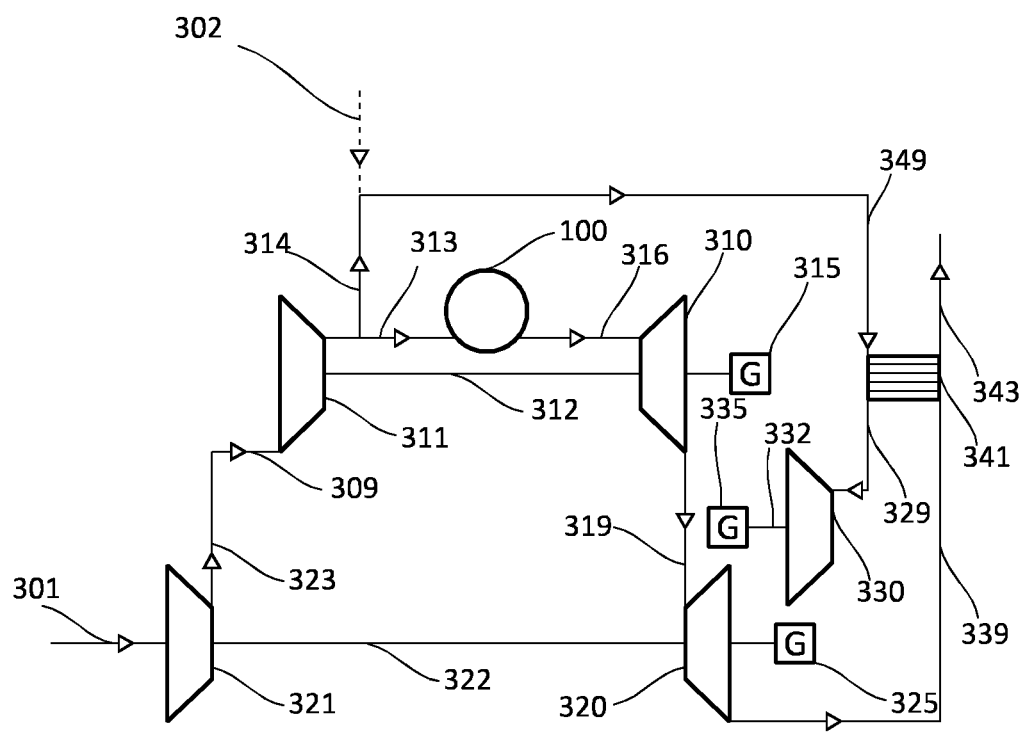

Referring to FIG. 2C, an air input 301 is provided for a low-pressure compressor 321. The low-pressure compressor has a common shaft 322 with a low-pressure turbine 320 and a low-pressure generator 325. The output from the low-pressure compressor is an input 309 for a high-pressure compressor 311. The high-pressure compressor has a common shaft 312 with a high-pressure turbine 310 and a high-pressure generator 315. An output from the high-pressure compressor 311 is divided into an input 313 to the pistonless combustor 100 and into a high-pressure bypass flow 314. Any embodiment of the pistonless combustor 100 presented in the present disclosure can be used. The pistonless combustor uses the high-pressure air input and fuel input to produce an output 316 which is directed to the high-pressure turbine 310 which rotates the shaft 312 which in turn rotates the high-pressure generator 315 to generate electric energy.

The output 319 from the high-pressure turbine is directed to the low-pressure turbine 320 which rotates the shaft 322 which in turn rotates the low-pressure generator 325 to generate electric energy. An output 339 from the low-pressure generator is directed to a second heat exchanger 341 which removes heat from the output flow 339 and the cooled output flow 343 is released from the system through exhaust. In an embodiment a flow from an external heat source can be arranged to the second heat exchanger.

The high-pressure bypass flow 314 from the high-pressure compressor 311 is directed to the second heat exchanger 341. Optionally, an input 302 from an external source can be combined to the high-pressure bypass flow 314. The external source is preferably an output of a wastegate of a turbocharger of an external combustion engine, but also other high temperature, high pressure sources can be utilized. The high-pressure bypass flow 314 optionally combined with the input 302 is the input 349 to the second heat exchanger 341. The second heat exchanger heats the input 349 using the heat extracted from the output 339 of the low-pressure turbine 320. The heated output 329 of the second heat exchanger 341 is directed to an auxiliary turbine 330 rotating an auxiliary generator 335 with a shaft 332.

Figure 2D:
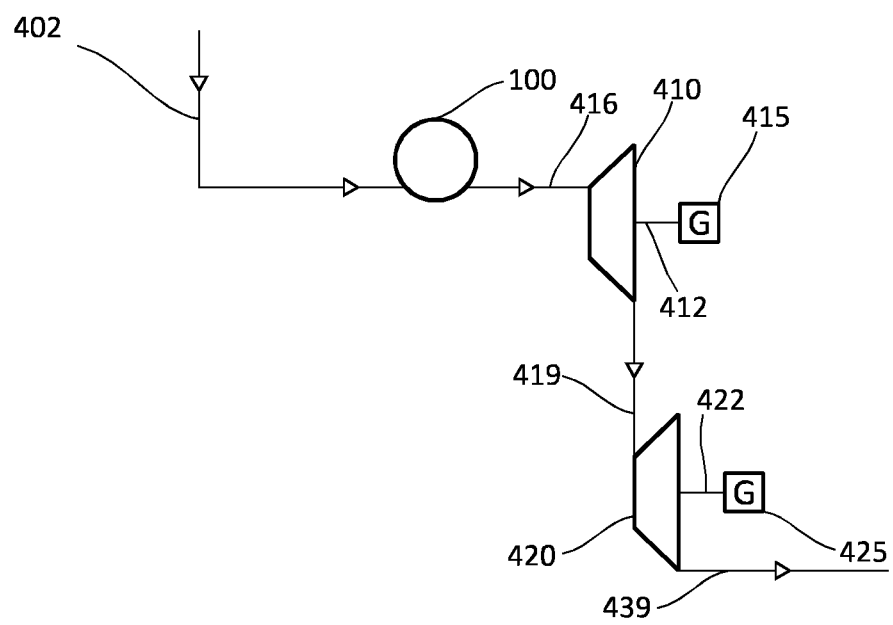
Figure 3:
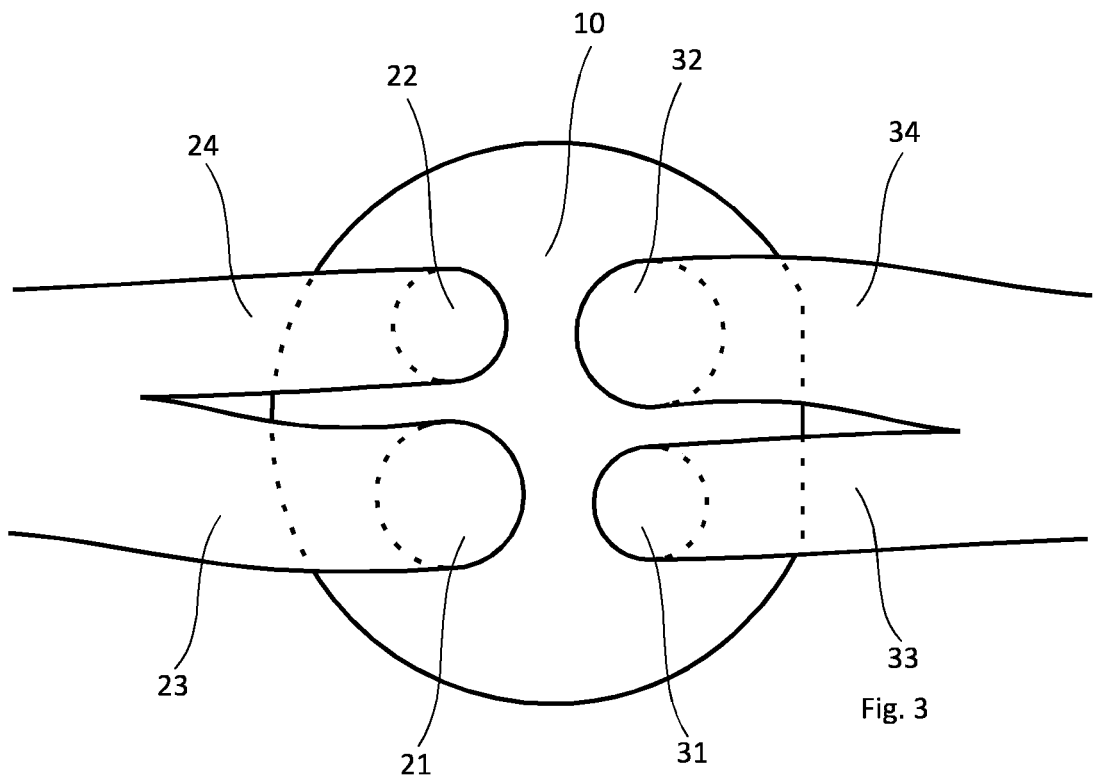
FIG. 3 illustrates a top view of an embodiment of a first combustion chamber.
Figure 4:
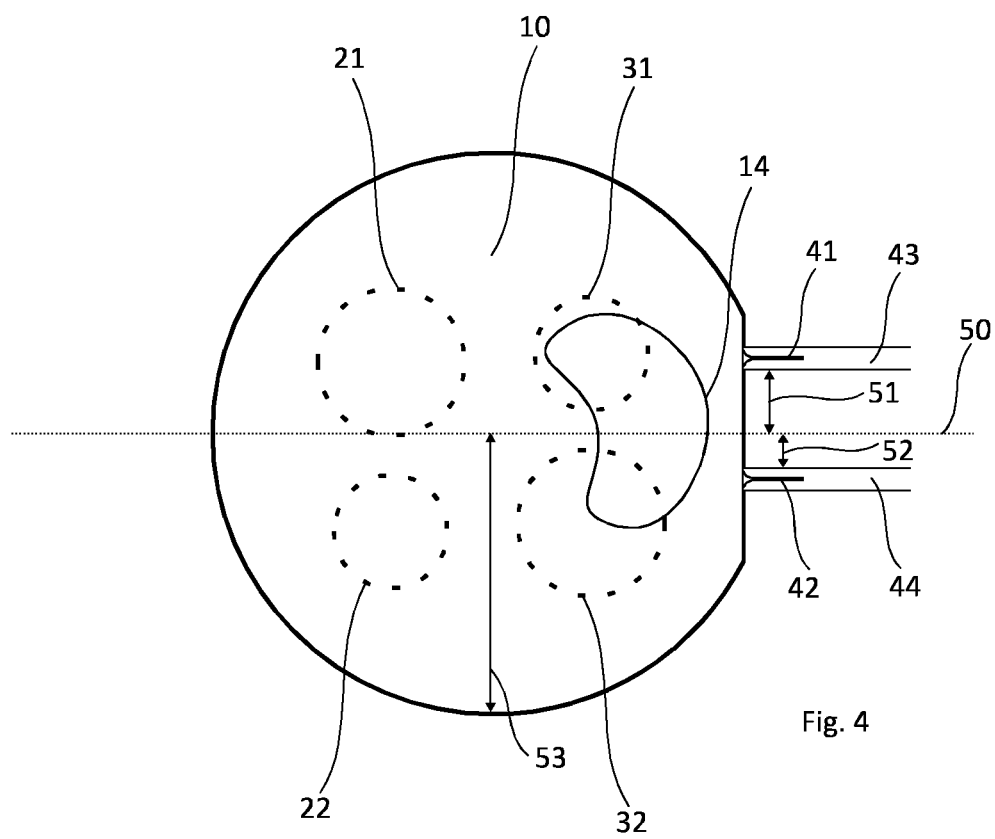
FIG. 4 illustrates a bottom view of an embodiment of a first combustion chamber.
Figure 5:
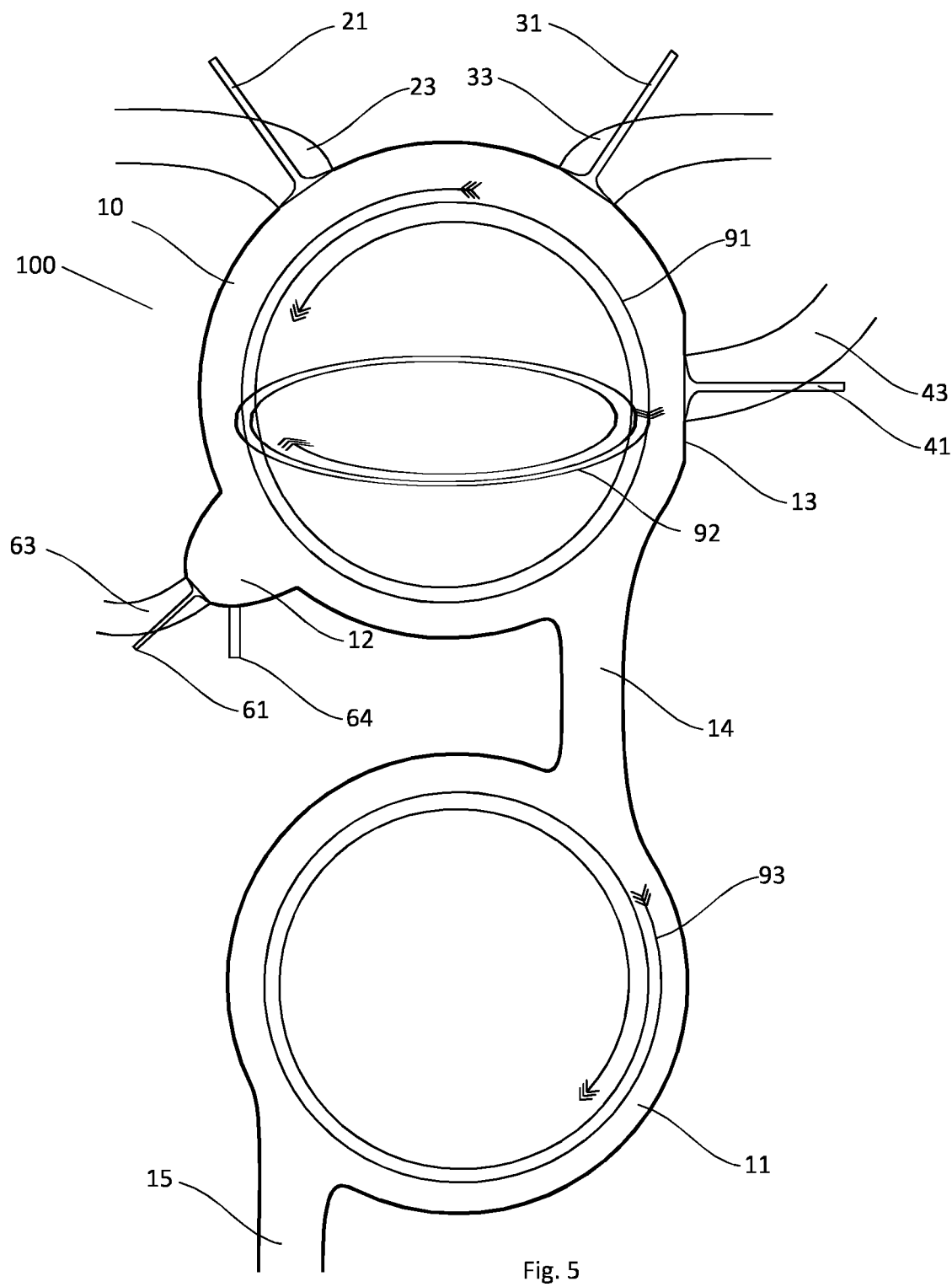
FIG. 5 illustrates flow components inside an embodiment of a pistonless combustor.

Referring to FIG. 2D, a high-pressure input 402 from an external source, such as a turbocharger of an external combustion engine is an input to the pistonless combustor 100. Any embodiment of the pistonless combustor 100 presented in the present disclosure can be used. The pistonless combustor uses the high-pressure input 402 and fuel input to produce an output 416 which is directed to the high-pressure turbine 410 which rotates a shaft 412 which in turn rotates a high-pressure generator 415 to generate electric energy.

The output 419 from the high-pressure turbine is directed to a low-pressure turbine 420 which rotates a shaft 422 which in turn rotates a low-pressure generator 425 to generate electric energy. An output 439 from the low-pressure generator is released from the system through exhaust.

In the systems of FIGS. 2A to 2D each of the first heat exchanger and the second heat exchanger can be a single heat exchanger or two or more heat exchanger connected in series or in parallel. Similarly, the input from a wastegate 102, 202, 302, 402 of an external turbo charger could also be an input directly from an external turbocharger.

An aspect of the invention is a pistonless combustor 100 (also referred as "the combustor") comprising at least one input channel 33, 34, 43, 44, 63 for air and fuel, an output channel 15, and a first combustion chamber 10. In an embodiment of the invention the combustor is a deflagration combustor where detonation combustion is avoided. Said at least one input channel 33, 34, 43, 44, 63 is controlled with a valve 31, 32, 41, 42, 61. In an embodiment of the invention the output channel 15 is constantly open to the first combustion chamber 10. In addition, one or more of the at least one input channel 33, 34, 43, 44, 63 has an eccentric alignment configured to produce an eccentric input flow of air creating a self-preserving flow pattern 91, 92 of a fuel-air mixture within the first combustion chamber 10. In an embodiment fuel is mixed with air within one or more of the at least one input channel to produce a fuel-air mixture.

Preferably two or more of the at least one input channel 33, 34, 43, 44, 63 has an eccentric alignment configured to produce an eccentric input flow of air creating a self-preserving flow pattern of a fuel-air mixture within the first combustion chamber 10. In an embodiment the self-preserving flow pattern preferably comprises combined swirl flow and tumble flow. In an embodiment the swirl flow is initiated by one input channel and the tumble flow is initiated by another input channel.

In an embodiment of the invention the eccentric input flow has a ratio e/r of at least 0, 1 and at most 0, 3, where e is a distance 51, 52 between a centre of the first combustion chamber and a line of alignment of the one or more of the at least one input channel, and where r is a distance 53 between the centre of the combustion chamber and an inner surface of an exterior wall of the first combustion chamber.

In an embodiment of the invention the geometry of the first combustion 10 chamber facilitates maintaining of the combined swirl flow and tumble flow by means of the first combustion chamber having an internal shape that is at least substantially one of the following: toroidal, spherical and cylindrical.

In an embodiment of the invention the pistonless combustor further comprises an air channel controlled by an air valve and having an eccentric alignment, the air channel being configured to supply air or fuel-air mixture into the combustion chamber for maintaining the combined swirl flow and tumble flow within the first combustion chamber.

In an embodiment of the invention the combustor comprises a pre-combustion chamber 12 having smaller volume than the first combustion chamber. The pre-combustion chamber 12 forms a cavity or a protrusion on the periphery of the first combustion chamber 10. Preferably the volume of the pre-combustion chamber is at most 10% of the volume of the first combustion chamber. In an embodiment of the pre-combustion chamber has a semi-open configuration in which there is a line of sight to each point in an inner wall of the pre-combustion chamber from an opening connecting the pre-combustion chamber to the first combustion chamber.

In an embodiment the passage 14 connects the first combustion chamber 10 to a second combustion chamber 11 and the output channel 15 is in connection with the second combustion chamber. Preferably the passage 14 is configured to be constantly open between the first combustion chamber and the second combustion chamber. The combustor is configured to produce a flow pattern which enables use of an open passage but of course a valve controlled passage can also be used. In an embodiment the second combustion chamber 11 has a volume larger than the first combustion chamber but smaller than three times the volume of the first combustion chamber 10. In an embodiment the second combustion chamber 11 has a volume smaller than the first combustion chamber but larger than 25% of the volume of the first combustion chamber 10. In an embodiment the second combustion chamber 11 has a volume larger than a quarter of the first combustion chamber but smaller than three times the volume of the first combustion chamber 10.

In an embodiment the output channel 15 connects the first combustion chamber to a pressure wave charger. Preferably the output channel is configured to be constantly open between the first combustion chamber and the pressure wave charger, i.e. the pressure wave charger replaces the second combustion chamber 11 presented in some embodiments of the present disclosure. The pistonless combustor is configured to produce a flow pattern which enables use of an open output channel 15 but of course a valve-controlled output channel can also be used.

In an embodiment of the invention the pistonless combustor comprises at least one input channel (23, 24) for air only, at least one input channel (33, 34, 43, 44) for air which may include fuel and at least one input channel (33, 34, 43, 44, 63) for fuel which may include air. The pistonless combustor (100) preferably comprises also at least one air input channel (43, 44) configured to input air jets having initial air velocity at least Mach 0, 2.

As an example, a combustion system comprises a single pistonless combustor 100 and a source of compressed air, such as a compressor 111, and a turbine 110 configured to received combustion products from the combustor and generate electric energy by rotating a generator 115.

As another example, a combustion system comprises one or more pistonless combustors and a source of compressed air, such as a compressor, and a turbine configured to received combustion products from the combustor and generate electric energy by rotating a generator. A portion of air from compressor output is led to the combustor to cool down the combustor. Said portion of air is heated by the combustor and the system is configured to direct the flow of heated air to the turbine or to an auxiliary turbine configured to operate the compressor or the generator or an auxiliary generator.

In an embodiment the combustion system is configured to direct the flow from the turbine to a heat exchanger. Said heat exchanger transfers heat from an external heat source and/or the heat released from the heated air flow coming from the turbine into a flow or air coming from the compressor. This flow heated by the heat exchanger is directed to the turbine or to the auxiliary turbine configured to operate the compressor or the generator or the auxiliary generator. Water or steam, or both water and steam, can be introduced to said heated flow from the compressor in a controlled manner using one or more valves. Said one or more valves can be e.g. rotating valves or electrically controlled valves. In an embodiment, the flow of heated air to the turbine or to the auxiliary turbine can be configured to flow through narrow passages.

The pistonless combustor in general can also in a method where timing of air and fuel inputs to a combustor is used for initiating and maintaining a flow pattern having two flow components to achieve fast deflagration combustion in a pistonless combustor. The embodiments of the pistonless combustor 100 of the present disclosure can also be used in the method.

An advantage of the method is that the flow pattern (91, 92, 93) is maintained within the combustor and pressure can rise even in case of an open output. A significant pressure gain can be achieved with the combustion process by optimising velocity of heat release with the method.

Figure 6:
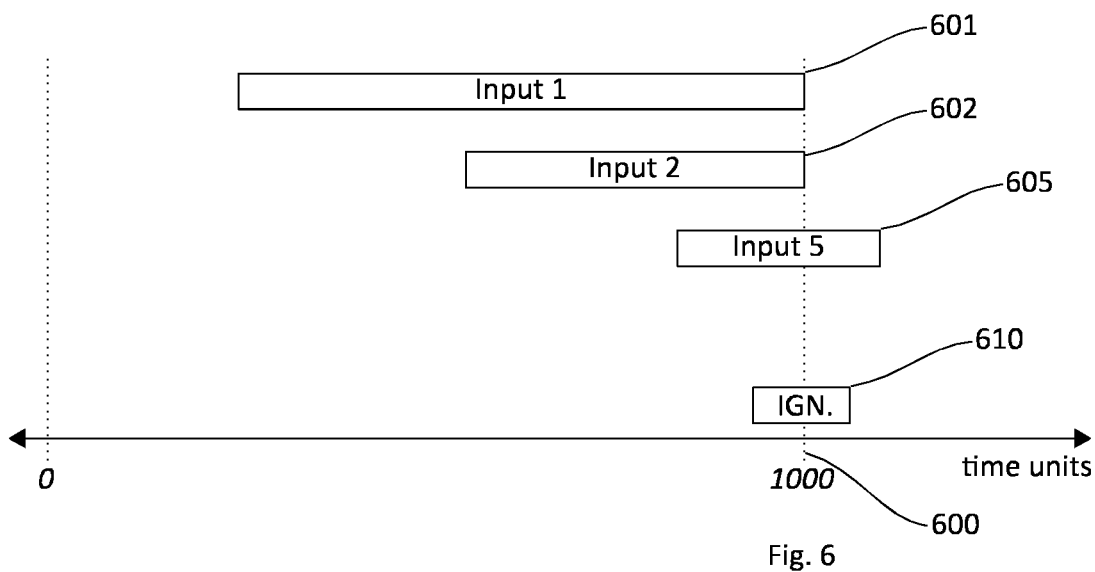
FIGS. 6 and 7 are examples of timing diagrams of a pistonless combustor.

Now referring to FIG. 6, an example of a timing diagram is disclosed. The diagram shows a time slot for each input valve and each input valve is opened and closed in each cycle within the respective time slot. One working cycle of the pistonless combustor is divided to time units from 0 to 1000 and FIG. 6 shows a single cycle starting from 0 units and ending to 1000 time units, the latter marking a reference point 600.

In FIG. 6, a time slot 601 for the first input valve starts from 750 units before the reference point and ends at the reference point. The first input valve 21 can be used for e.g. input of air for scavenging the pistonless combustor. A time slot 602 for the second input valve starts from 450 time units before the reference point and ends at the reference point. The second input valve 31 can be used for e.g. input of fuel and air. FIG. 6 does not show a time slot for the third input valve 22 but in an embodiment, the third input valve 22 is also used for scavenging the pistonless combustor with air like the first input valve 21 and a similar time slot could be used for the third input valve as is used for the first input valve. FIG. 6 does not show a time slot for the fourth input valve 32 but in an embodiment, the fourth input valve 32 is also used for input of fuel and air like the second input valve 31 and a similar time slot could be used for the fourth input valve 32 as is used for the second input valve 31.

A time slot 605 for the fifth input valve 41 starts from 170 time units before the reference point and ends 100 time units after the reference points. The fifth input valve 41 can be used for e.g. input of fuel and air. Finally, a time slot 610 for ignition is shown and it starts from 70 time units before the reference point and ends at 60 time units after the reference point 600. The ignition takes place within the time slot 610.

Figure 7:
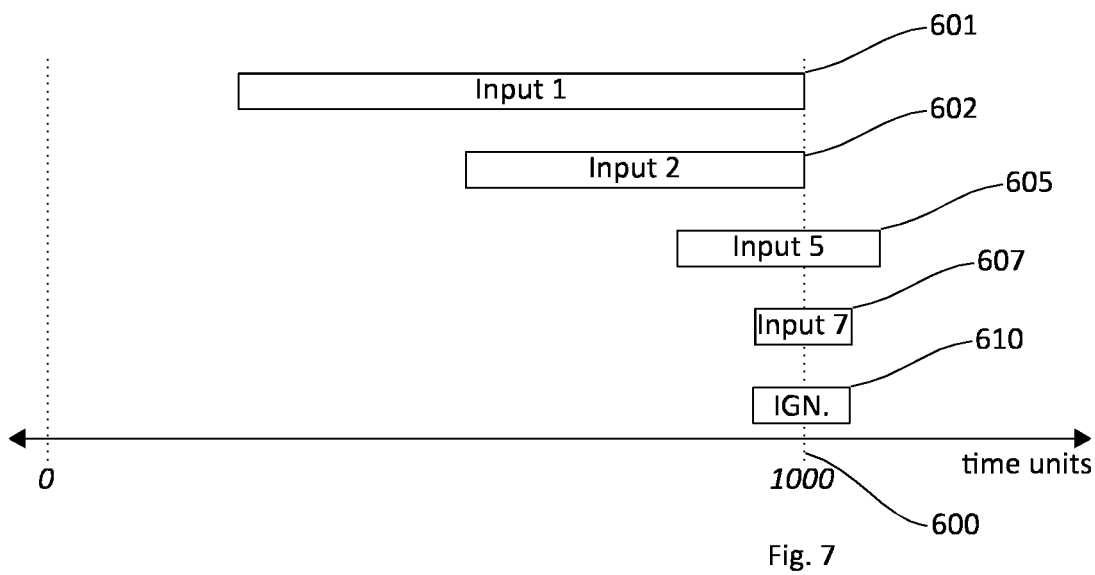

Now referring to FIG. 7 where another example of a timing diagram is disclosed. The diagram shows a time slot for each input valve and each input valve is opened and closed in each cycle within the respective time slot. One working cycle of the pistonless combustor is divided to time units from 0 to 1000 and FIG. 7 shows a single cycle starting from 0 units and ending to 1000 time units, the latter marking a reference point 600.

In FIG. 7, a time slot 601 for the first input valve starts from 750 units before the reference point and ends at the reference point. The first input valve 21 can be used for e.g. input of air for scavenging the pistonless combustor. A time slot 602 for the second input valve 31 starts from 450 time units before the reference point and ends at the reference point. The second input valve 31 can be used for e.g. input of fuel and air. FIG. 7 does not show a time slot for the third input valve 22 but in an embodiment, the third input valve is also used for scavenging the pistonless combustor with air like the first input valve and a similar time slot could be used for the third input valve as is used for the first input valve. FIG. 7 does not show a time slot for the fourth input valve 32 but in an embodiment, the fourth input valve 32 is also used for input of fuel and air like the second input valve 31 and a similar time slot could be used for the fourth input valve 32 as is used for the second input valve 31.

A time slot 605 for the fifth input valve 41 starts from 170 time units before the reference point and ends 100 time units after the reference points. The fifth input valve 41 can be used for e.g. input of fuel and air. A time slot 607 for the seventh input valve 61 starts from 160 time units before the reference point and end 65 time units after the reference. The seventh input valve 61 can be used for e.g. input of fuel and air to e.g. an ignition area such as the pre-combustion chamber 12. Finally, a time slot 610 for ignition is shown and it starts from 70 time units before the reference point and ends at 60 time units after the reference point 600. The ignition takes place within the time slot 610.

The same definitions and purposes of the input valves described in connection with FIGS. 1 to 5 can be applied to the timing diagrams of FIGS. 6 and 7. The timings disclosed in the present application can be used in the pistonless combustor described in connection with FIGS. 1 to 5.

An aspect of the invention is a method of controlling a deflagration combustion process in a pistonless combustor. The combustion process consists of repeating working cycles divided to equally long time units, e.g. from 0 to 1000. The division to time units is artificial and any number of time units can be used to divide a single cycle.

The method comprises a step of opening a first input valve 21 and introducing air into the first combustion chamber 10 of the pistonless combustor 100. A purpose of this air input is to scavenge combustion products of a previous cycle from the pistonless combustor. The first input valve is preferably opened at earliest 750 time units before a reference point 600 and preferably closed at latest at the reference point 600. In an embodiment, the first input valve can be a single valve 21 or a set of valves 21, 23, such as a combination of two or more valves. The size, shape and other physical properties may or may not vary between the set of valves. Timing between the valves of the set of valves can be adjusted individually.

Depending on the number of valves, physical properties of the valve and most of all properties of the pistonless combustor, the first input valve 21 can be opened at earliest 600, 680 or 800 time units before the reference point 600.

The reference point 600 is a closing event of a second input valve 31. The reference point could be any other defined point in a cycle. The reference point is merely an anchor to which timings of all events are tied to.

The method further comprises a step of opening a second input valve 31 after opening the first input valve 21 and introducing air into the combustor. The input of air via the second input valve thereby preferably initiates a flow pattern having a first flow component 91 within the first combustion chamber 10. The second input valve is preferably opened at earliest 450 time units before a reference point and closed at the reference point. As said, the closing event of the second input valve defines the reference point. In an embodiment, the second input valve can be a single valve 31 or a set of valves 31, 33, such as a combination of two or more valves. The size, shape and other physical properties may or may not vary between the set of valves. Timing between the valves of the set of valves can be adjusted individually.

Depending on the number of valves, physical properties of the valve and most of all properties of the pistonless combustor, the second input valve 31 can be opened at earliest 300, 350 or 400 time units before the reference point.

The method also comprises a step opening a fifth input valve 41 after opening the second input valve 31 and introducing air into the combustor. The air input of the fifth input valve is in a nonparallel angle in relation to the input through the second input valve thereby creating a second flow component to the flow pattern within the combustor for increasing speed of combustion propagation. The fifth input valve is preferably opened at earliest 170 time units before a reference point and the fifth input valve is preferably closed at latest 100 time units after the reference point. In an embodiment, the fifth input valve 41 can be a single valve or a set of valves, such as a combination of two or more valves, such as the fifth input valve 41 and the sixth input valve 42. The size, shape and other physical properties may or may not vary between the set of valves. Timing between the valves of the set of valves can be adjusted individually.

Depending on the number of valves, physical properties of the valve and most of all properties of the combustor, the fifth input valve can be opened at earliest 150, 160 or 200 time units before the reference point.

The method further comprises a step of introducing fuel from any input valve opening after the opening of the first input valve 21, wherein the fuel is mixed into the air creating a fuel-air mixture flowing within the flow pattern. Preferably an input of fuel-air mixture through either the second input valve 31, the fourth input valve 33, the fifth input valve 41, the sixth input valve 43, the seventh input valve 61, or any combination of them or even all of them, is used instead of pure air input.

The method still comprises a step of igniting the fuel-air mixture within the pistonless combustor thereby increasing pressure within the pistonless combustor. The ignition is performed preferably at earliest 40 units before the reference point and preferably at latest 60 units after the reference point, In an embodiment of the invention the method further comprises a step of opening a seventh input valve 61 and introducing fuel-air mixture into an ignition area. Ignition area is a space within the combustor in which said ignition step takes place and an additional fuel-air mixture input facilitates ignition of the whole content of the combustor. Preferably the ignition are is a pre-combustion chamber 12 as disclosed in the present disclosure. The seventh input valve 61 is preferably opened at earliest 160 time units before the reference point and closed preferably at latest 65 units after the reference point. In an embodiment, the seventh input valve can be a single valve or a set of valves, such as a combination of two or more valves. The size, shape and other physical properties may or may not vary between the set of valves. Timing between the valves of the set of valves can be adjusted individually.

Depending on the number of valves, physical properties of the valve and most of all properties of the combustor, the seventh input valve can be opened at earliest 150, 160 or 200 time units before the reference point.

In an embodiment of the invention the second input valve 31, the fifth input valve 41 or both of them have an eccentric alignment producing an eccentric input flow of air for initiating and maintaining the flow pattern of the fuel-air mixture within the combustor. The eccentric alignment means that the input is directed off-center, i.e. directed to miss the center point of the combustor. The eccentric alignment together with shaping of the combustor can create the flow pattern 91, 92 within the combustor.

In an embodiment of the invention the first flow component 91 is a swirl flow and the second flow component 92 is a tumble flow. In an embodiment the first flow component is a tumble flow and the second flow component is a swirl flow. In an embodiment the first flow component and the second flow component are two vortices non-parallel between each other.

In an embodiment of the invention geometry of the combustor facilitates maintaining of the combined swirl flow and tumble flow. This is achieved by means of the combustor having an internal shape that is at least substantially one of the following: toroidal, spherical and cylindrical.

In an embodiment of the invention the pistonless combustor has an output channel 15 that is constantly open. The flow pattern within the combustor enables use of the constantly open output channel 15. Of course, an output channel controlled with an output valve can also be used but it is not essential and it leads to a more complicated solution.

A set of examples of timing of valves based on prototype testing or simulation is disclosed in Tables 1 to 3.

A second aspect of the present disclosure is a pistonless combustor. The second aspect relates to a combustor and especially to a pistonless combustor.

An object of the second aspect is to provide a device which eliminates or alleviates the disadvantages disclosed in paragraph background of the invention. The object of the second aspect is achieved by a pistonless combustor which is characterized by what is stated in embodiment A below.

The preferred embodiments of the second aspect are disclosed in embodiments B-O below.

The second aspect is based on the idea of eccentric alignment of inputs in a combustion chamber which alignment can produce a self-preserving flow pattern in a pistonless combustor.

An advantage of the device of the second aspect is that the flow pattern is produced within the combustor and pressure can rise even in case of an open output. A significant pressure gain can be achieved with the device of the second aspect which optimises velocity of heat release.

Embodiments of the second aspect of the present disclosure:

A. A pistonless combustor (100) comprising at least one input channel (33, 34, 43, 44, 63) for air and fuel, an output channel (15), and a first combustion chamber (10), wherein said at least one input channel is controlled with a valve (31, 32, 41, 42, 61), characterized in that one or more of the at least one input channel has an eccentric alignment configured to produce an eccentric input flow of air creating a self-preserving flow pattern (91, 92) of a fuel-air mixture within the first combustion chamber (10).

B. A pistonless combustor (100) according to embodiment A, wherein said self-preserving flow pattern comprises a first flow component (91) and a second flow component (92) in a nonparallel angle in relation to the first flow component (91) for increasing speed of combustion propagation.

C. A pistonless combustor (100) according to embodiment A or B, wherein said eccentric input flow has a ratio e/r of at least 0, 1 and at most 0, 3, where e is a distance (51, 52) between a centre of the first combustion chamber (10) and a line of alignment of the one or more of the at least one input channel (33, 34, 43, 44, 63), and where r is a distance (53) between the centre of the first combustion chamber and an inner surface of an exterior wall of the first combustion chamber.

D. A pistonless combustor (100) according to embodiment B or C, wherein geometry of the first combustion chamber (10) facilitates maintaining of the first flow component and the second flow component by means of the first combustion chamber having an internal shape that is substantially one of the following: toroidal, spherical and cylindrical.

E. A pistonless combustor (100) according to any one of embodiments A to D, wherein output channel (15) is constantly open to the first combustion chamber (10).

F. A pistonless combustor (100) according to any one of embodiments A to E, wherein the pistonless combustor is a deflagration combustor.

G. A pistonless combustor (100) according to any one of embodiments A to F, wherein the pistonless combustor further comprises an air channel (43, 44) controlled by an air valve (41, 42) and having an eccentric alignment, the air channel being configured to supply air or fuel-air mixture into the first combustion chamber (10) for maintaining the first flow component (91) and the second flow component (92) within the first combustion chamber (10).

H. A pistonless combustor (100) according to any one of embodiments A to G, wherein fuel is mixed with air within one or more of the at least one input channel (33, 34, 43, 44, 63) to produce a fuel-air mixture.

I. A pistonless combustor (100) according to any one of embodiments A to H, wherein the pistonless combustor comprises a pre-combustion chamber (12) having smaller volume than the first combustion chamber (10), wherein the pre-combustion chamber (12) forms a cavity on the periphery of the first combustion chamber (10).

J. A pistonless combustor (100) according to embodiment I, wherein the volume of the pre-combustion chamber (12) is at most 10% of the volume of the first combustion chamber (10).

K. A pistonless combustor (100) according to embodiment I, wherein the pre-combustion chamber (12) has a semi-open configuration in which there is a line of sight to each point in an inner wall of the pre-combustion chamber (12) from an opening connecting the pre-combustion chamber (12) to the first combustion chamber (10).

L. A pistonless combustor (100) according to any one of embodiments A to K, wherein a passage (14) connects the first combustion chamber (10) to a second combustion chamber (11) and the second combustion*chamber (11) is connected to the output channel (15).

M. A pistonless combustor (100) according to any one of embodiments A to L, wherein the second combustion chamber (11) has a volume larger than a quarter of the volume of the first combustion chamber (10) but smaller than three times the volume of the first combustion chamber (10).

N. A pistonless combustor (100) according to any one of embodiments A to K, wherein the output channel (15) connects the first combustion chamber to a pressure wave charger.

O. A pistonless combustor (100) according to any one of embodiments A to N, wherein the pistonless combustor comprises at least one air input channel (43, 44) configured to input air jets having initial air velocity at least Mach 0, 2.

It will be obvious to a person skilled in the art that, as the technology advances, the inventive concept can be implemented in various ways. The invention and its embodiments are not limited to the examples described above but may vary within the scope of the claims.

While the present invention has been described in accordance with preferred compositions and embodiments, it is to be understood that certain substitutions and alterations may be made thereto without departing from the spirit and scope of the following claims.

TABLE 1

Example 1, based on prototype.

Combustor volume 1 liter
Operating frequency 17 Hz
Liquid fuel, gasoline

| Example 1 | Open | Close |
|---|---|---|
| Input 1 | 438 | 811 |
| Input 2 | 734 | 1000 |
| Input 5 | 842 | 942 |
| Input 7 | 892 | 942 |
| Spark | 974 | 974 |

TABLE 2

Example 2, based on simulation.

Combustor volume 22 litres
Operating frequency 15 Hz
Liquid fuel, kerosene

| Example 2 | Open | Close |
|---|---|---|
| Input 1 | 300 | 736 |
| Input 2 | 697 | 1000 |
| Input 5 | 902 | 1000 |
| Input 7 | 905 | 961 |
| Spark | 961 | 961 |

TABLE 2-continued

Example 2, based on simulation.

Combustor volume 22 litres
Operating frequency 15 Hz
Liquid fuel, kerosene

| Example 2 | Open | Close |
|---|---|---|

TABLE 3

Example 3, based on simulation.

Combustor volume 500 litres
Operating frequency 5 Hz
Gaseous fuel, methane

| Example 3 | Open | Close |
|---|---|---|
| Input 1 | 388 | 744 |
| Input 2 | 677 | 1000 |
| Input 5 | 859 | 957 |
| Input 7 | 905 | 961 |
| Spark | 975 | 975 |

LIST OF REFERENCE NUMBERS 10 first combustion chamber
11 second combustion chamber
12 pre-combustion chamber
13 shaped wall section
14 passage
15 output channel
21 first input valve/input valve 1
22 third input valve/input valve 3
23 first inlet
24 third inlet
31 second input valve/input valve 2
32 second inlet
33 fourth input valve/input valve 4
34 fourth inlet
41 fifth input valve/input valve 5
42 fifth inlet
43 sixth input valve/input valve 6
44 sixth inlet
50 center line
51 distance of fifth inlet
52 distance of sixth inlet
53 distance between inner wall and centre
61 seventh input valve/input valve 7
63 seventh inlet
64 ignition device
91 first flow component
92 second flow component
93 third flow component
100 pistonless combustor
101 air input
102 input from wastegate
109 high pressure compressor input
110 high pressure turbine
111 high pressure compressor
112 shaft
113 input to pistonless combustor
114 high pressure bypass
115 high pressure generator
116 output from pistonless combustor
117 input to first heat exchanger
118 flow to second heat exchanger
119 output from high pressure turbine
120 low pressure turbine
121 low pressure compressor
122 shaft
123 output from low pressure compressor
125 low pressure generator
130 auxiliary turbine
132 shaft
135 auxiliary generator
139 output from low pressure turbine
140 first heat exchanger
141 second heat exchanger
142 output from first heat exchanger
143 output from second heat exchanger
149 input to second heat exchanger
201 air input
202 input from wastegate
209 high pressure compressor input
210 high pressure turbine
211 high pressure compressor
212 shaft
213 input to pistonless combustor
214 high pressure bypass
215 high pressure generator
216 output from pistonless combustor
217 input to first heat exchanger
219 output from high pressure turbine
220 low pressure turbine
221 low pressure compressor
222 shaft
223 output from low pressure compressor
225 low pressure generator
230 auxiliary turbine
232 shaft
235 auxiliary generator
240 first heat exchanger
242 output from first heat exchanger
301 air input
302 input from wastegate
309 high pressure compressor input
310 high pressure turbine
311 high pressure compressor
312 shaft
313 input to pistonless combustor
314 high pressure bypass
315 high pressure generator
316 output from pistonless combustor
319 output from high pressure turbine
320 low pressure turbine
321 low pressure compressor
322 shaft
325 low pressure generator
330 auxiliary turbine
332 shaft
335 auxiliary generator
339 output from low pressure turbine
341 second heat exchanger
343 output from second heat exchanger
349 input to second heat exchanger
402 input from wastegate
410 high pressure turbine
412 shaft
415 high pressure generator
416 output from pistonless combustor
419 output from high pressure turbine 420 low pressure turbine
422 shaft
425 low pressure generator
439 output from low pressure turbine
600 reference point for timing
601 time slot for first input valve
602 time slot for second input valve
605 time slot for fifth input valve
607 time slot for seventh input valve
610 time slot for ignition

We claim:

1. A method of controlling a deflagration combustion process in a pistonless combustor having an outer wall and a center therewithin, the combustion process consisting of repeating working cycles divided to equally long time units from 0 to 1000 so that one working cycle of the deflagration combustion process is 1000 time units, and the method comprising the steps of:

opening a first input valve, the first input valve introducing scavenging air into the pistonless combustor thereby scavenging combustion products of a previous cycle;

opening a second input valve after opening the first input valve, the second input valve introducing first-flow air into the pistonless combustor thereby initiating a flow pattern having a first circumferential flow component rotating within the pistonless combustor about the center, the second input valve being opened at earliest 450 time units before a reference point and closed at the reference point;

opening a second-flow air input valve after opening the second input valve, the second-flow air input valve introducing second-flow air into the pistonless combustor in a nonparallel angle in relation to the first-flow air input through the second input valve thereby creating a second circumferential flow component to the flow pattern rotating within the pistonless combustor for increasing speed of combustion propagation, the second-flow air input valve being opened at earliest 170 time units before the reference point and closed at latest 100 time units after the reference point;

introducing a fuel into the pistonless combustor after the opening of the first input valve, creating a fuel-air mixture flowing within the flow pattern; and igniting the fuel-air mixture within the pistonless combustor thereby increasing pressure within the pistonless combustor, where the ignition is performed at earliest 70 time units before the reference point and at latest 60 time units after the reference point, wherein the reference point is a closing event of the second input valve, and the outer wall of the pistonless combustor has an off-center output channel connected thereto that is constantly open.

2. The method of claim 1, wherein the method further comprises opening an ignition fuel-air mixture input valve, the ignition fuel-air mixture input valve introducing an ignition fuel-air mixture into an ignition area, the ignition fuel-air mixture input valve being opened at earliest 160 time units before the reference point and closed at latest 65 time units after the reference point.

3. The method of claim 1, wherein the second input valve and the second-flow air input valve have an eccentric alignment producing an eccentric input flow of air for initiating and maintaining the flow pattern of the fuel-air mixture within the pistonless combustor.

4. The method of claim 1, wherein the first circumferential flow component is a swirl flow and the second circumferential flow component is a tumble flow, or the first circumferential flow component is a tumble flow and the second circumferential flow component is a swirl flow.

5. The method of claim 4, wherein a geometry of the pistonless combustor facilitates maintaining of the combined swirl flow and tumble flow by means of the pistonless combustor having an internal shape that is at least substantially one of the following: toroidal, spherical and cylindrical.

6. The method of claim 1, wherein the first input valve is open at least 300 time units in each working cycle.

7. The method of claim 1, wherein the second input valve is open at least 200 time units in each working cycle.

8. The method of claim 1, wherein the second-flow air input valve is open at least 50 time units and at most 150 time units in each working cycle.

9. The method of claim 1, wherein the first input valve is opened at earliest 750 time units before the reference point and closed at a latest at the reference point.

10. The method of claim 1, wherein combustion of the air-fuel mixture lasts at least 10 time units and at most 100 time units of a working cycle.

* * * * *